United States Patent

[11] 3,588,895

[72] Inventors William B. Goggins, Jr.
Dayton, Ohio;
Joseph L. Poirier, Chelmsford, Mass.
[21] Appl. No. 859,445
[22] Filed Sept. 19, 1969
[45] Patented June 28, 1971
[73] Assignee The United States of America as represented by the Secretary of the Air Force

[54] SYNTHETIC APERTURE ANALYSIS RADAR
3 Claims, 3 Drawing Figs.
[52] U.S. Cl. .................................................. 343/5R, 343/17.5
[51] Int. Cl. ...................................................... G01s 9/02
[50] Field of Search ......................................... 343/5, 5 (CM), 17.5

[56] References Cited
UNITED STATES PATENTS
3,121,868  2/1964  Hausz et al. .................. 343/5

Primary Examiner—T. H. Tubbesing
Attorneys—Harry A. Herbert, Jr. and George Fine ABSTRACT: A synthetic aperture analysis radar system in which the transmitted and received signals are noise signals. The return signal is added to a reference signal derived from the transmitted signal. Under certain conditions the power spectrum of the sum signal is modulated. Synthetic aperture processing can then be performed since the power spectrum is essentially coherent.

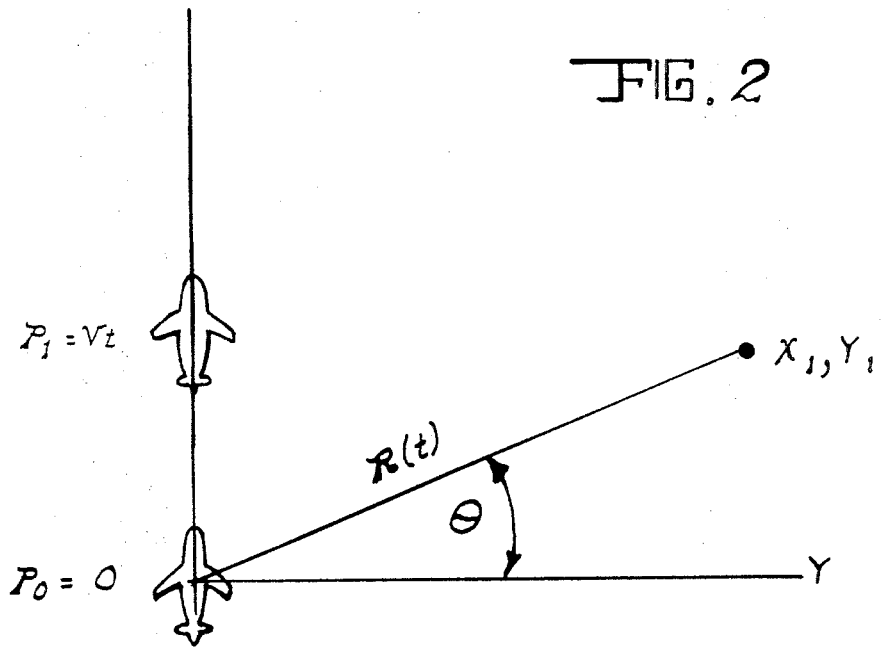
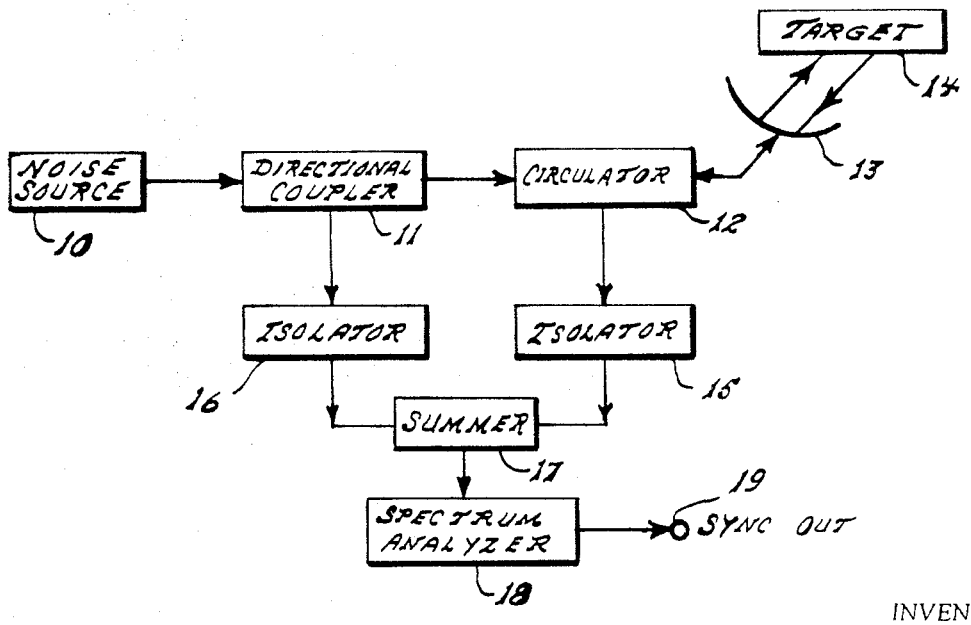

SYNTHETIC APERTURE ANALYSIS RADAR

BACKGROUND OF THE INVENTION

This invention relates to radars and more particularly synthetic aperture analysis radars in which a radar beam is formed synthetically. The synthetic aperture technique is basically an arraying technique. In an ordinary radar array antenna many elements are spaced along the aperture and the energy from each element is phased properly in order to add vectorially to the energy from the other elements in such a manner as to form a beam. In a synthetic array radar only one element is used and it is moved from place to place. The signal from each element is then stored until the element is moved through all the positions. The signals are then shifted in phase so as to add up properly to form the beam. The vehicle to move the element is usually an aircraft, although any method of imparting motion may be used.

The present invention contemplates the use of noise signals in synthetic aperture radars. This has many important operational advantages, such as low mutual interference and reduced fluctuations. Fluctuations in the return signal is the principal shortcoming of conventional radars and limits the maximum resolution obtainable. The inventor solves the problem of synthetic aperture processing of noise or noncoherent radar signals. This has been heretofore impossible except in the case of a pseudorandom radar system.

SUMMARY OF THE INVENTION

The invention is a radar system in which the transmitted and received signals are noise signals. The return signal is added to a reference signal derived from the original transmitted signal. Under certain conditions the power spectrum of the sum signal is modulated. However, unlike other noise radars, synthetic aperture processing can be performed since the power spectrum is essentially coherent. Since the power spectrum is a coherent waveform it is processed to form a focused synthetic aperture beam.

An object of the invention is to provide a synthetic aperture spectrum analysis radar to form a focused synthetic aperture beam.

Yet another object of the present invention is to provide a radar system with the power spectrum thereof being a coherent waveform that is processed to form a focused synthetic aperture beam.

Yet another object of the present invention is to provide a radar system for the synthetic aperture processing of noise and noncoherent radar signals.

DESCRIPTION OF THE DRAWINGS

FIG. 1 is a block diagram of the basic spectrum analysis radar;

FIG. 2 illustrates the geometry of the problem of synthetic aperture processing.

DESCRIPTION OF THE PREFERRED EMBODIMENT

Figure 3:
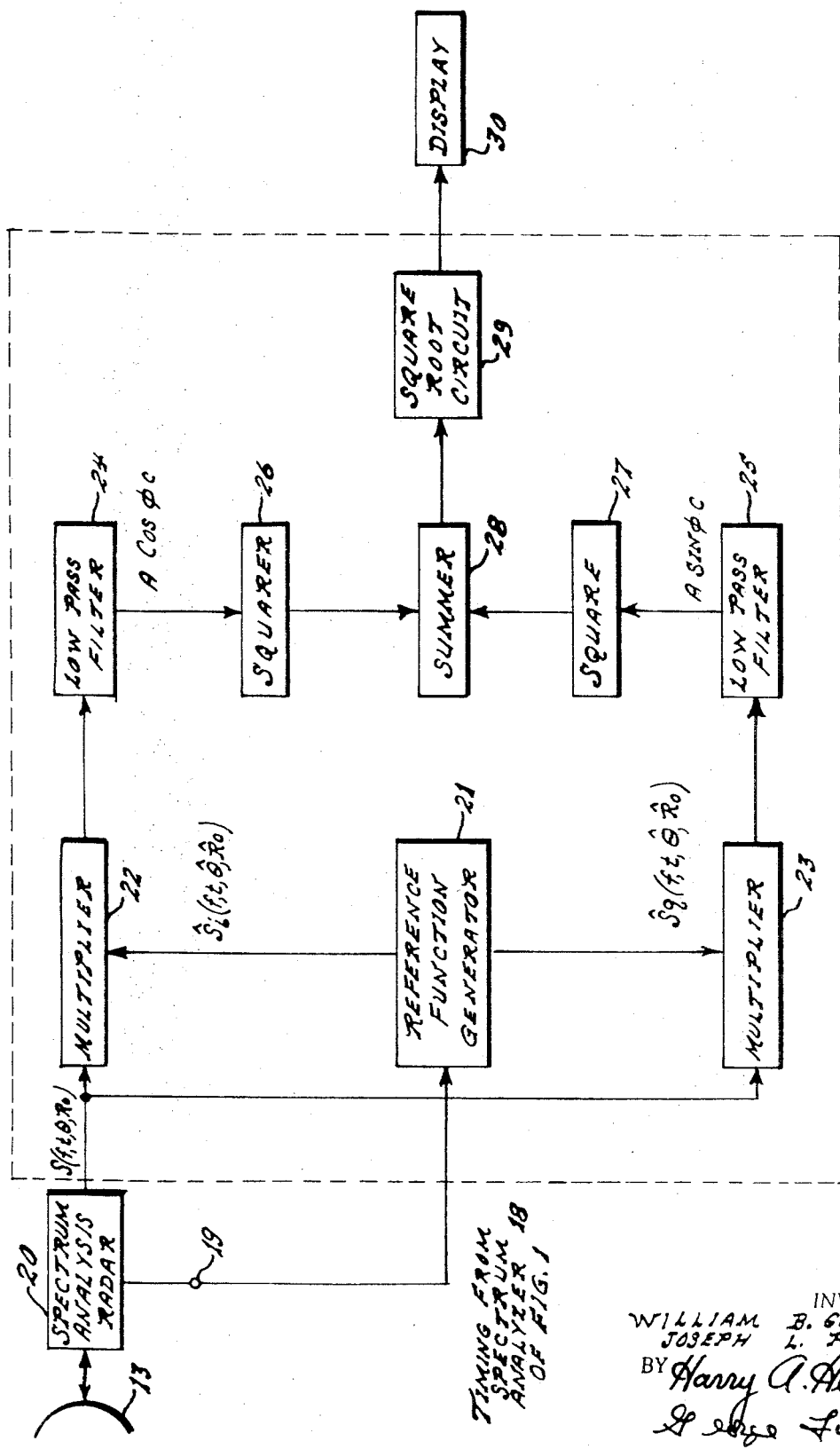
FIG. 3 is a block diagram of synthetic processor for a spectrum analysis radar.

FIG. 1 is a block diagram of the basic spectrum analysis radar before synthetic aperture processing. Noise source 10 generates a band limited noise signal which is transmitted by antenna 13 toward target 14 after passing through directional coupler 11 and circulator 12. A small preselected portion of the transmitted signal is coupled off by directional coupler 11 and is added to the return signal from antenna 13. This is accomplished by the return signal passing from antenna 13 to circulator 12 through isolator 15 to summer 17 while a portion of the band limited signal from noise source 10 is obtained from directional coupler 11 which then passes through isolator 16 to summer 17. The power spectrum of this summed signal is given by $$S(f) = A \cos\left(\frac{4\pi R f}{c} + \varphi_{c_1}\right) \quad (1)$$

where R is the range to the target, c is the speed of light, A is the magnitude of the power spectrum, and for a constant reference is proportional to the return from the target, $f$ is frequency, and $\varphi_{c_1}$ is the phase shift due to the target. The summed signal is then received by spectrum analyzer 18 to provide target information. Spectrum analyzer 18 also provides a synchronization output at terminal 19.

The use of this system with synthetic aperture processing can best be understood by analyzing the geometry of the problem by referring to FIG. 2. A vehicle, usually an aircraft, carrying the radar system, flies at velocity $v$ from point $P_0=0$ to $P_1=vt$. One wishes to focus a synthetic beam at point $x_1,y_1$. The range to $x_1, y_1$ is R(t) and is given by $$R(t) = \sqrt{y_1^2 + (x_1 - vt)^2} \quad (2)$$

This can be written as $$R(t) = R_0 \sqrt{\frac{1 + v^2 t^2 - 2v x_1 t}{R_0^2}} \quad (3)$$

With the binomial expansion and neglecting higher order terms this expands to $$R(t) = R_0 \left(\frac{1 + v^2 t^2 - 2v x_1 t - v^2 x_1^2 t^2}{2R_0^2 2R_0^4}\right). \quad (4)$$

The preceding can be shown to be equal to $$R(t) = R_0 + 4\pi vt \sin\theta \frac{-2\pi v^2 t^2 \cos^2\theta}{R_0} \quad (5)$$

If we substitute (5) into (1) we see that as the vehicle moves from $P_0$ to $P_1$ we have $$S(f, t, \theta, R_0) = A \cos\left[\frac{4\pi f}{C}\left(R_0 - vt \sin\theta + \frac{v^2 t^2 \cos^2\theta}{2R_0} + \varphi_0\right)\right] \quad (6)$$

Thus we see that the power spectrum is not only a function of the frequency $f$, but as the aircraft flies along, the power spectrum becomes a function of time and the angle $\Theta$ from the aircraft to $x_l, y_l$ as well as the range $R_o$. Thus this function can be used to obtain angular resolution, A. This can be accomplished in the following way.

FIG. 3 is a block diagram of a synthetic aperture processor for spectrum analysis radar 20 which was shown in block diagram form in FIG. 1. Reference function generator 21 has as its output, $$\hat{S}_I = \cos\left[\frac{4\pi f}{C}\left(R_0 - vt \sin\theta + \frac{v^2 t^2 \cos^2\theta}{2R_0}\right)\right]$$
$$\hat{S}_Q = \sin\left[\frac{4\pi f}{C}\left(R_0 - vt \sin\theta + \frac{v^2 t^2 \cos^2\theta}{2R_0}\right)\right] \quad (7)$$

$\hat{R}_0$ and $\hat{\theta}_0$ are predetermined and are the range and azimuth angles to the point it is desired for the radar system to look at. $\hat{S}_I$ and $\hat{S}_Q$ are then multiplied by S in multipliers 22 and 23, the output of spectrum analysis radar 20. Signals returning from the point $x_l, y_l$ will cause a DC voltage after multiplication while those at other ranges and/or angles will have no DC component but only a sinusoidal component and so will be rejected. The outputs of multipliers 22 and 23 are passed through low-pass filters 24 and 25 to squarers 26 and 27, respectively. The outputs of squarers 26 and 27 are added in summer 28 and then passed through square root circuit 29. Thus, in order to determine A, we square A cos $\Phi_c$ and A sin $\Phi_c$, sum the squares and take the square root. The output of square root circuit 29 is shown on conventional display 30. Note that timing from the spectrum analyzer synchronizes the reference function generator. The above setup will give the magnitude of the return from targets located at only $\hat{\theta}_0$ and $\hat{R}_0$. In order to be more useful, returns from many different angles and ranges should be processed. This can be done quite simply by having many different reference functions and many channels of multiplication. An excessive amount of hardware is not necessary if the functions enclosed by the dotted lines are performed by a special purpose digital computer. It would then be possible to process the different functions sequentially.

It is noted that the reference function generator is conventional and may be an oscillator providing a predetermined linear FM signal.

We claim:

1. A synthetic aperture spectrum analysis radar comprising means to generate a noise signal, means to transmit said noise signal toward a target of interest at a preselected position to obtain a return target signal and to receive the return target signal, first means to sum said return target signal with a preselected portion of the transmitted noise signal to obtain a modulated power spectrum, means to analyze the spectrum of the sum signal to obtain a resultant signal, a function generator providing a predetermined signal, first and second means to multiply said resultant signal with said predetermined signal, first and second means to square the outputs of said first and second multipliers, respectively, second means to sum the outputs of said first and second squaring means, and means to obtain the square root of the output signal of said second summing means.

2. A synthetic aperture spectrum analysis radar as defined in claim 1 further including means to display the output signal from the square root means.

3. A synthetic aperture analysis radar as defined in claim 2 further including a first low-pass filter interposed between said first multiplying means and said second summing means, and a second low-pass filter interposed between said second multiplying means and said second summing means.